United States Patent
Seol et al.

(10) Patent No.: US 12,456,796 B2
(45) Date of Patent: Oct. 28, 2025

(54) ELECTRONIC DEVICE USING HINGE STRUCTURE AS ANTENNA

(71) Applicant: Samsung Electronics Co., Ltd., Suwon-si (KR)

(72) Inventors: Kyungmoon Seol, Suwon-si (KR); Kyunggu Kim, Suwon-si (KR); Sumin Yun, Suwon-si (KR); Kyihyun Jang, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/328,176

(22) Filed: Jun. 2, 2023

(65) Prior Publication Data
US 2023/0327324 A1  Oct. 12, 2023

Related U.S. Application Data

(63) Continuation of application No. PCT/KR2021/017861, filed on Nov. 30, 2021.

(30) Foreign Application Priority Data

Dec. 4, 2020 (KR) .................. 10-2020-0168878
Jan. 8, 2021 (KR) .................. 10-2021-0002637

(51) Int. Cl.
*H04M 1/05* (2006.01)
*H01Q 1/24* (2006.01)
(Continued)

(52) U.S. Cl.
CPC .............. *H01Q 1/243* (2013.01); *H01Q 1/44* (2013.01); *H04M 1/0235* (2013.01); *H04M 1/0268* (2013.01)

(58) Field of Classification Search
CPC .......... G09F 9/301; H01Q 1/243; H01Q 1/42; H01Q 1/44; G06F 1/1624; G06F 1/1652;
(Continued)

(56) References Cited

U.S. PATENT DOCUMENTS 9,911,369 B2  3/2018  Kim et al.
9,964,995 B1  5/2018  Morrison et al.
(Continued)

FOREIGN PATENT DOCUMENTS

JP  2012-134770 A  7/2012
KR  10-2014-0121649 A  10/2014
(Continued)

OTHER PUBLICATIONS

IP.com search history (Year: 2025).*
(Continued)

*Primary Examiner* — Moustapha Diaby
(74) *Attorney, Agent, or Firm* — Jefferson IP Law, LLP

(57) ABSTRACT

An electronic device is provided, The electronic device includes a housing, a hinge including a conductive portion, at least one contact electrically connecting the conductive portion and at least one of a first frame and second frame of the housing, and a wireless communication circuit. The first frame includes a first conductive portion. The second frame includes a second conductive portion. In a first state, the wireless communication circuit at least one of transmits or receives a signal of a first frequency band, based on the first conductive portion and the second conductive portion. In a second state, the wireless communication circuit at least one of transmits or receives the signal of the first frequency band, based on the first conductive portion and the conductive portion.

20 Claims, 13 Drawing Sheets

(51) Int. Cl.
*H01Q 1/44* (2006.01)
*H04M 1/02* (2006.01)
*H04M 1/23* (2006.01)

(58) Field of Classification Search
CPC .... G06F 1/1656; G06F 1/1681; G06F 1/1698; H04M 1/0235; H04M 1/0268
USPC ........................................................ 455/566
See application file for complete search history.

(56) References Cited

U.S. PATENT DOCUMENTS

| | | | |
|---|---|---|---|
| 10,152,086 | B2 | 12/2018 | Choi et al. |
| 10,615,485 | B2 | 4/2020 | Chun et al. |
| 11,470,729 | B2 | 10/2022 | Kim et al. |
| 2010/0013720 | A1* | 1/2010 | Sakata ................... H01Q 1/243 343/702 |
| 2010/0328171 | A1 | 12/2010 | Mak et al. |
| 2011/0032161 | A1* | 2/2011 | Nakanishi ............ H01Q 1/2258 343/702 |
| 2012/0154225 | A1 | 6/2012 | Kanazawa |
| 2019/0320048 | A1* | 10/2019 | Yang ..................... G06F 1/1652 |
| 2020/0020255 | A1* | 1/2020 | Yoon ..................... G06F 1/1656 |
| 2020/0333855 | A1 | 10/2020 | Kim et al. |
| 2021/0219437 | A1* | 7/2021 | Kim ...................... G06F 1/1652 |
| 2022/0061175 | A1 | 2/2022 | Oh et al. |

FOREIGN PATENT DOCUMENTS

| | | |
|---|---|---|
| KR | 10-2016-0148116 A | 12/2016 |
| KR | 10-2019-0143029 A | 12/2019 |
| KR | 10-2020-0072190 A | 6/2020 |
| KR | 10-2127403 B1 | 6/2020 |
| KR | 10-2020-0121199 A | 10/2020 |

OTHER PUBLICATIONS

European Search Report dated Mar. 13, 2024; European Appln. No. 21900963.6-1224 / 4242784 PCT/KR2021017861.

International Search Report with Written Opinion and English translation dated Mar. 15, 2022; International Appln. No. PCT/KR2021/017861.

Korean Notice of Patent Grant with English translation dated Apr. 22, 2025; Korean Appln. No. 10-2021-0002637.

* cited by examiner

ELECTRONIC DEVICE USING HINGE STRUCTURE AS ANTENNA

CROSS-REFERENCE TO RELATED APPLICATION(S)

This application is a continuation application, claiming priority under § 365(c), of an International application No. PCT/KR2021/017861, filed on Nov. 30, 2021, which is based on and claims the benefit of a Korean patent application number 10-2020-0168878, filed on Dec. 4, 2020, in the Korean Intellectual Property Office, and of a Korean patent application number 10-2021-0002637, filed on Jan. 8, 2021, the disclosure of each of which is incorporated by reference herein in its entirety.

BACKGROUND

1. Field

The disclosure relates to an electronic device using a hinge structure as an antenna.

2. Description of Related Art

With the advance of display technologies, there is ongoing development on various types of display devices. For example, display devices such as a computer, a tablet Personal Computer (PC), a mobile phone, or the like have a high distribution rate, and efforts have been recently made to develop a new form of the display device in order to meet the needs of users who want newer and more diverse functions.

A flexible display device is an example of a next-generation display device as a result of such efforts. A portable electronic device may include a display having a larger area to provide a wide screen. However, since the electronic device increases in size in proportion to an increase in a size of the display, there is a limit in the size of the display. In order to overcome the limitation, in the flexible display as the next-generation display device, part of the display may be selectively drawn into a housing.

The above information is presented as background information only to assist with an understanding of the disclosure. No determination has been made, and no assertion is made, as to whether any of the above might be applicable as prior art with regard to the disclosure.

SUMMARY

An electronic device capable of selectively changing a size of a display visually viewed to the outside may have a state in which the display is partially drawn into a housing (hereinafter, referred to as a first state) and a state in which the display is partially drawn out of the housing (hereinafter, referred to as a second state). For example, the electronic device capable of selectively changing the size of the display visually viewed to the outside may include a slidable electronic device or a rollable electronic device. The electronic device may receive a signal of a designated frequency band by using frame structures constituting a side surface of the electronic device in the first state as an antenna. On the other hand, since the frame structures used as the antenna are disposed to be spaced apart while the electronic device transitions to the second state, it is not possible to secure an antenna resonance length secured in the first state, and antenna radiation efficiency in a low frequency band may deteriorate.

Aspects of the disclosure are to address at least the above-mentioned problems and/or disadvantages and to provide at least the advantages described below. Accordingly, an aspect of the disclosure is to provide an apparatus which uses a hinge structure of an electronic device as a radiator to receive a signal of a designated frequency band also in the second state, in the substantially same manner as in the first state.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first frame and a second frame, the first frame including a first insulating member formed in a first point and a first conductive portion extending from the first point to a first end of the first frame, and the second frame including a second insulating member formed in a second point and a second conductive portion extending from the second point to a second end of the second frame facing the first end of the first frame; a hinge structure coupled to the first end of the first frame and the second end of the second frame, foldable in at least one point, and including a conductive portion; at least one contact structure electrically connecting the conductive portion and at least one of the first frame and the second frame; and a wireless communication circuit disposed inside the housing. In a first state in which the hinge structure is in a folded state and the first end of the first frame and the second end of the second frame are electrically in contact, the wireless communication circuit may at least one of transmit or receive a signal of a first frequency band, based on the first conductive portion of the first frame and the second conductive portion of the second frame. In a second state in which the hinge structure is in an unfolded state and the first end of the first frame and the conductive portion of the hinge structure are electrically connected by the at least one contact structure, the wireless communication circuit may at least one of transmit or receive the signal of the first frequency band, based on the first conductive portion of the first frame and the conductive portion of the hinge structure.

In accordance with another aspect of the disclosure, an electronic device is provided. The electronic device includes a frame structure constituting at least part of a side surface of the electronic device, a hinge structure including a conductive portion in the at least part thereof, at least one contact structure electrically coupling the conductive portion of the hinge structure and at least one of a first frame and a second frame, and a wireless communication circuit. The frame structure may include the first frame and the second frame. The first frame may include a first insulating member and a first conductive portion of the first frame extending from the first insulating member to a first end of the first frame in one point. The second frame may include a second insulating member and a second conductive portion extending from the second insulating member to a second end of the second frame facing the first end of the first frame in one point. The hinge structure which is folded in at least one point may be coupled to the first conductive portion of the first frame and the second conductive portion of the second frame. Upon transitioning from a second state to a first state, the hinge structure may be folded and drawn into the frame structure, and the first end of the first frame and the second end of the second frame may be in contact so that the first conductive portion of the first frame is electrically coupled to the second conductive portion of the second frame. Upon transitioning from the first state to the second state, the hinge structure may be unfolded and drawn out from the frame structure, and the first frame and the second frame may be spaced apart by a specific distance. The first conductive portion of the first frame may be electrically coupled to the conductive portion of the hinge structure through the at least one contact structure. The wireless communication circuit may at least one of transmit or receive a signal of a first frequency band, based on the first conductive portion of the first frame and the second conductive portion of the second frame in the first state, and may at least one of transmit or receive the signal of the first frequency band, based on the first conductive portion of the first frame and the conductive portion of the hinge structure in the second state.

According to various embodiments disclosed in the disclosure, it is possible to improve or maintain antenna radiation efficiency of a designated band in a second state of an electronic device capable of selectively changing a size of a display visually viewed to the outside.

In addition, according to various embodiments, it is possible to improve or maintain antenna radiation efficiency of a low frequency band by bringing a frame constituting a side surface of the electronic device to be electrically in contact with a hinge structure in the second state of the electronic device capable of selectively changing the size of the display visually viewed to the outside.

In addition, according to various embodiments, it is possible to improve or maintain antenna radiation efficiency of a frequency band to be used in transmission and/or reception by constituting a segmented portion for an antenna in the hinge structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
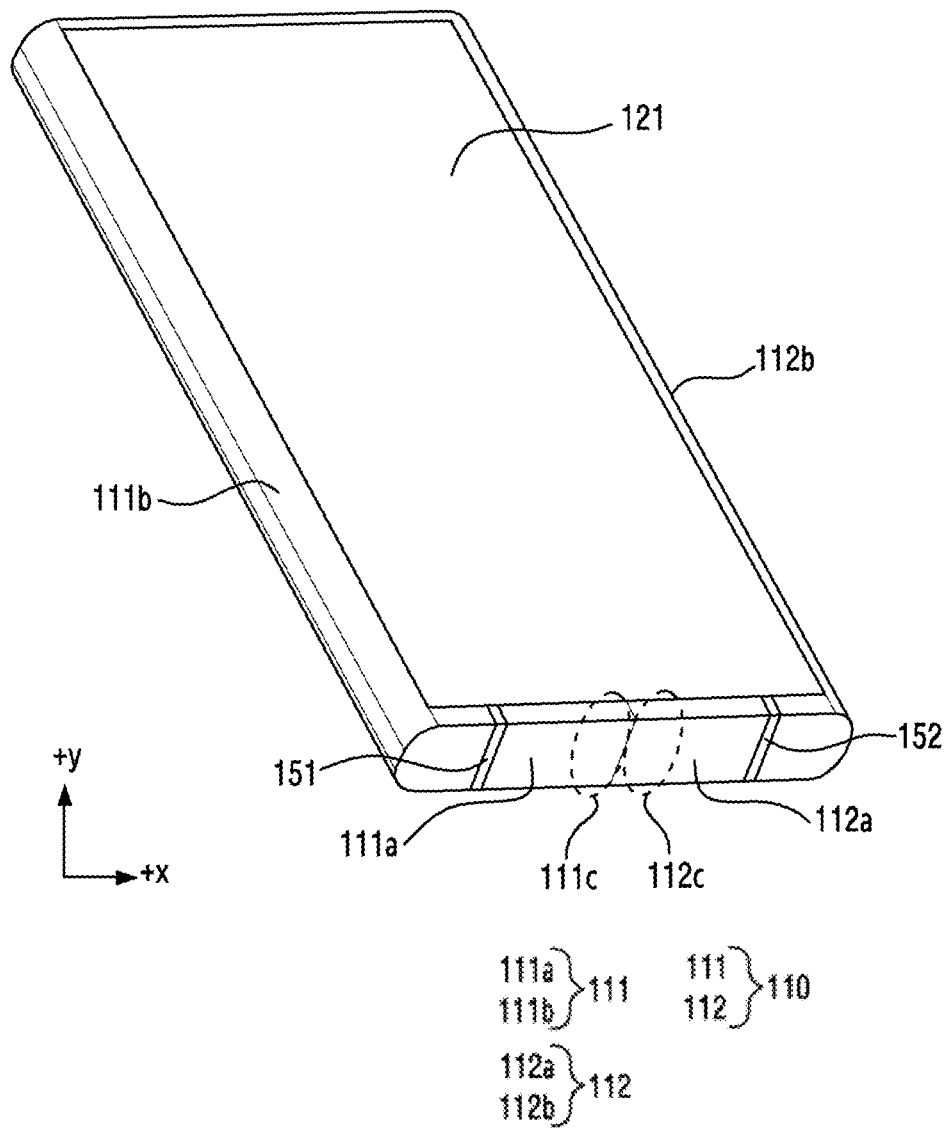
FIG. 1A is a front perspective view of an electronic device in a first state according to an embodiment of the disclosure.

FIG. 1A is a front perspective view of an electronic device in a first state according to an embodiment of the disclosure.

Figure 1B:
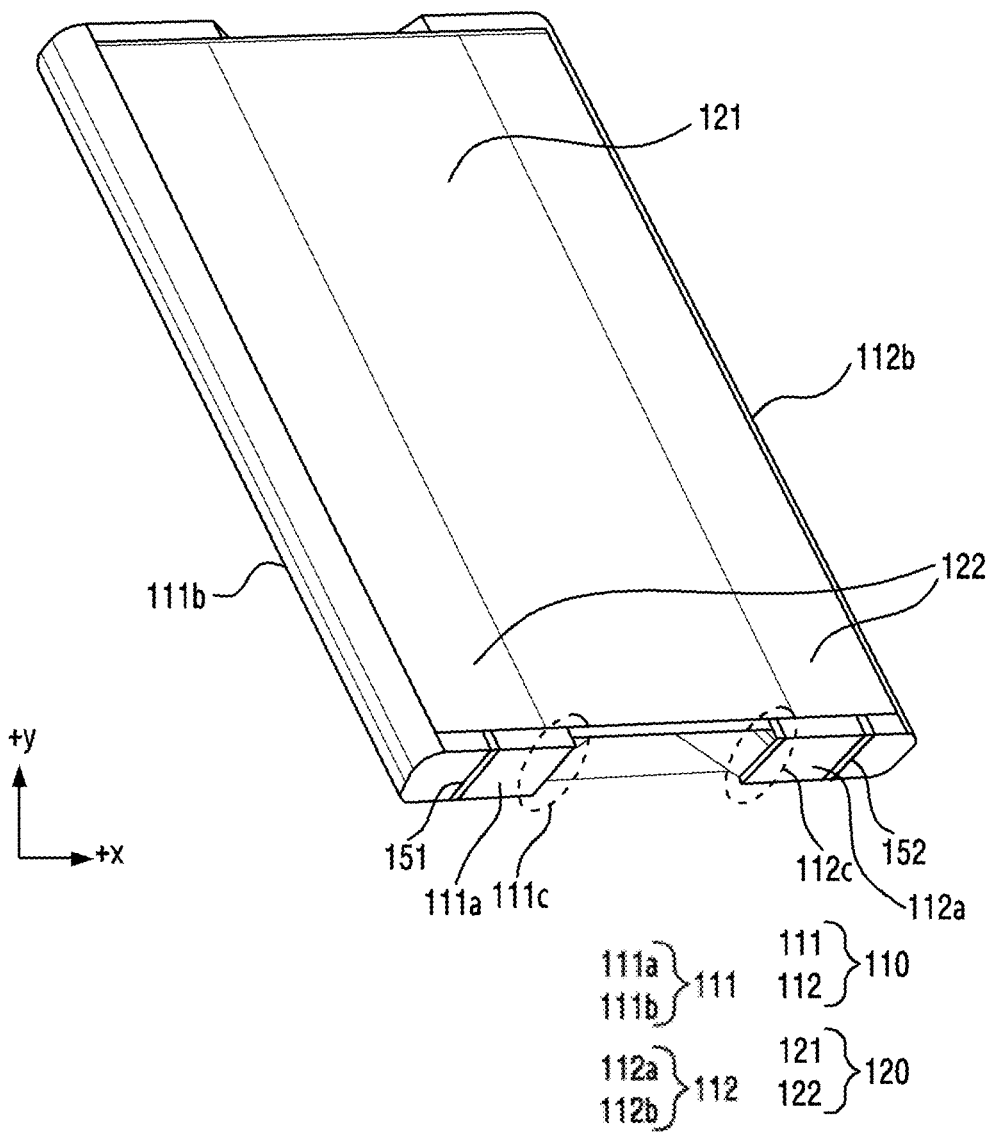
FIG. 1B is a front perspective view of an electronic device in an intermediate state according to an embodiment of the disclosure.

FIG. 1B is a front perspective view of an electronic device in an intermediate state according to an embodiment of the disclosure.

Figure 1C:
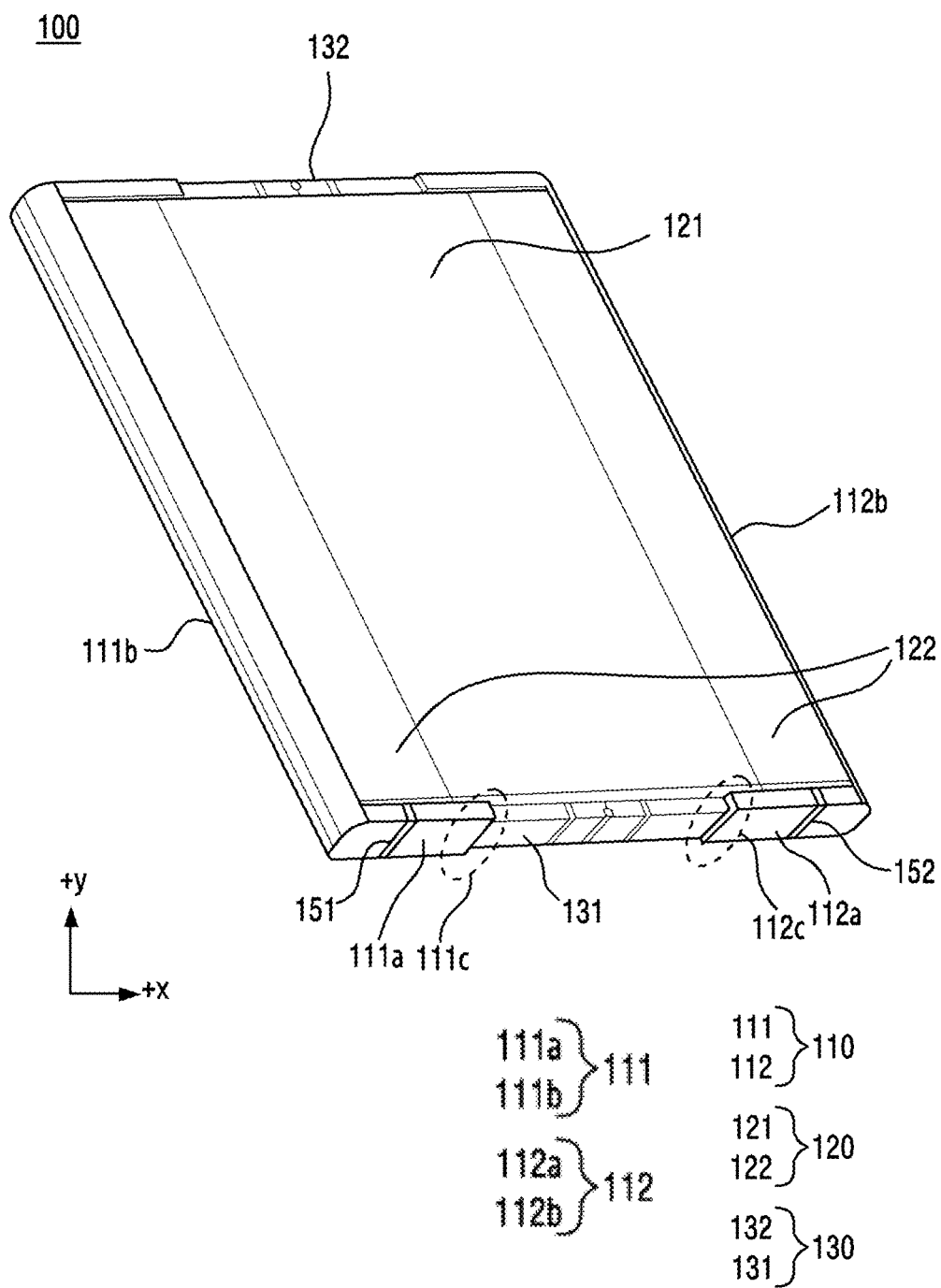
FIG. 1C is a front perspective view of an electronic device in a second state according to an embodiment of the disclosure.

FIG. 1C is a front perspective view of an electronic device in a second state according to an embodiment of the disclosure.

Referring to FIGS. 1A, 1B, and 1C, in an embodiment, an electronic device 100 may include a housing 110, a flexible display 120, and/or a hinge structure (or, hinge) 130.

According to various embodiments disclosed in the disclosure, a face to which the flexible display 120 is disposed may be defined as a front face of the electronic device 100, and a face facing away from the front face may be defined as a rear face of the electronic device 100. A face surrounding a space between the front face and the rear face may be defined as a side surface of the electronic device 100.

According to an embodiment, the housing 110 may constitute some regions of the front face of the electronic device 100, the rear face, and the side surface. In an embodiment, the housing 110 may include a conductive material (e.g., metal).

According to an embodiment, the housing 110 may include a first frame 111 and second frame 112 constructing the side surface of the electronic device 100.

According to an embodiment, the electronic device 100 may have the first state and the second state.

According to an embodiment, the first state and second state of the electronic device 100 may be determined depending on a relative location of the first frame 111 and second frame 112. For example, referring to FIG. 1A, a state of the electronic device 100, in which the first frame 111 and the second frame 112 are adjacent to each other and the first frame 111 and the second frame 112 are electrically coupled, may be referred to as the first state. As another example, referring to FIG. 1C, a state of the electronic device 100, in which the second frame 112 moves in a +x direction in the first state and the first frame 111 moves in a −x direction in the first state to increase a relative distance between the first frame 111 and the second frame 112 and in which the hinge structure (or, hinge) 130 is electrically coupled to at least one of a first conductive portion 111a of the first frame 111 and a third conductive portion 112a of the second frame 112 may be referred to as the second state.

According to an embodiment, in the first state, the first frame 111 and the second frame 112 may be directly in contact or may be electrically coupled through a contact structure (or, contact, contact member). For example, in the first state, a first end 111c of the first frame 111 and a second end 112c of the second frame 112 may be in contact directly and electrically coupled. As another example, in the first state, the first end 111c of the first frame 111 and the second end 112c of the second frame 112 may be electrically coupled by a contact structure (or, contact, contact member) to be described below.

According to an embodiment, the first frame 111 may include the first conductive portion 111a and/or a second conductive portion 111b. In an embodiment, a first segmented portion 151 may be disposed between the first conductive portion 111a and/or the second conductive portion 111b. In an embodiment, the first segmented portion 151 may include an insulating material. The insulating material may be constructed of ceramic, plastic, resin or a combination of at least two of these materials.

According to an embodiment, the second frame 112 may include the third conductive portion 112a and/or a fourth conductive portion 112b. In an embodiment, a second segmented portion 152 may be disposed between the third conductive portion 112a and/or the fourth conductive portion 112b. In an embodiment, the second segmented portion 152 may include an insulating material.

According to an embodiment, the flexible display 120 may occupy most of the front face of the electronic device 100.

According to an embodiment, the flexible display 120 may include at least some flat shapes and at least some curved shapes.

According to an embodiment, the flexible display 120 may include a first portion 121 and a second portion 122 extending from the first portion 121 and capable of being drawn into the electronic device 100.

In an embodiment, the electronic device 100 may transition between the first state and the second state due to a user's manipulation or a mechanical operation.

According to an embodiment, the second portion 122 of the flexible display 120 may be drawn out of or drawn into the housing 110 depending on a state of the electronic device 100. For example, upon transitioning of the electronic device 100 from the first state to the second state, the first frame 111 and the second frame 112 may move to be spaced apart from each other, and the second portion 122 of the flexible display 120 may be drawn out of the housing 110. As another example, upon transitioning of the electronic device 100 from the second state to the first state, the first frame 111 and the second frame 112 may move to be adjacent to each other, and the second portion 122 of the flexible display 120 may be drawn into the housing 110.

According to an embodiment, although the second portion 122 is disposed with the first portion 121 interposed therebetween in the flexible display 120 of FIG. 1B, a structure of disposing the first portion 121 and/or second portion 122 of the flexible display 120 is not limited thereto.

According to another embodiment, when in the first state, the second portion 122 may be disposed to be adjacent to the first frame 111. For example, when in the first state, at least part of the second portion 122 may be located inside the first frame 111. In this case, the first portion 121 may be located in a second direction (e.g., a +x direction) of the second portion 122.

As another example, when in the first state, the second portion 122 may be disposed to be adjacent to the second frame 112. For example, at least part of the second portion 122 may be located inside the second frame 112. In this case, the first portion 121 may be located in a first direction (e.g., a −x direction) of the second portion 122.

In various embodiments, when it is said that the flexible display 120 is drawn out (or exposed), it may mean that a drawn-out portion of the display is viewed from the outside of the electronic device 100, and when it is said that the flexible display 120 is drawn in, it may mean that a drawn-in portion of the flexible display 120 is not viewed from the outside of the electronic device 100. For example, at least part of the second portion 122 may be drawn out from the first frame 111 or the second frame 112, or may be drawn into the first frame 111 or the second frame 112.

According to an embodiment, the flexible display 120 may emit light from a pixel to transfer information to a user, and the light emitted from the pixel may be transferred to the outside of the electronic device 100 through the flexible display 120. In an embodiment, the flexible display 120 may include a protective layer such as tempered glass. In this case, the flexible display 120 may constitute at least part of the front face of the electronic device 100.

Referring to FIG. 1C, according to an embodiment, the hinge structure 130 may include a first hinge structure 131 and a second hinge structure 132.

In an embodiment, the first hinge structure 131 may be coupled to the first conductive portion 111a of the first frame 111 and/or the third conductive portion 112a of the second frame 112.

In an embodiment, the second hinge structure 132 may be coupled to the second conductive portion 111b of the first frame 111 and/or the fourth conductive portion 112b of the second frame 112.

According to an embodiment, a state of the electronic device 100 may be determined depending on the hinge structure 130. For example, referring to FIG. 1A, a state in which the hinge structure 130 is folded and inwardly drawn into the housing 110 and in which the first frame 111 and the second frame 112 move in directions adjacent to each other and thus are electrically in contact may be referred to as the first state (or a fully folded state).

As another example, referring to FIG. 1B, a state in which the hinge structure 130 is folded and drawn into the housing 110 and in which the first frame 111 and the second frame 112 are spaced apart may be referred to as an intermediate state. For example, the intermediate state may be a state between the first state and the second state.

As another example, referring to FIG. 1C, a state in which the hinge structure 130 is unfolded and drawn out from the housing 110, in which the first frame 111 and the second frame 112 move in directions facing away from each other, and in which the drawn-out hinge structure 130 is electrically in contact with at least one of the first conductive portion 111a of the first frame 111 and the third conductive portion 112a of the second frame 112 may be referred to as the second state (or an unfolded state).

A shape of the electronic device of FIGS. 1A, 1B, and/or 1C is for describing an example of an electronic device capable of extending a display region, and the shape of the electronic device is not limited to the illustration of FIGS. 1A, 1B, and/or 1C.

Figure 2:
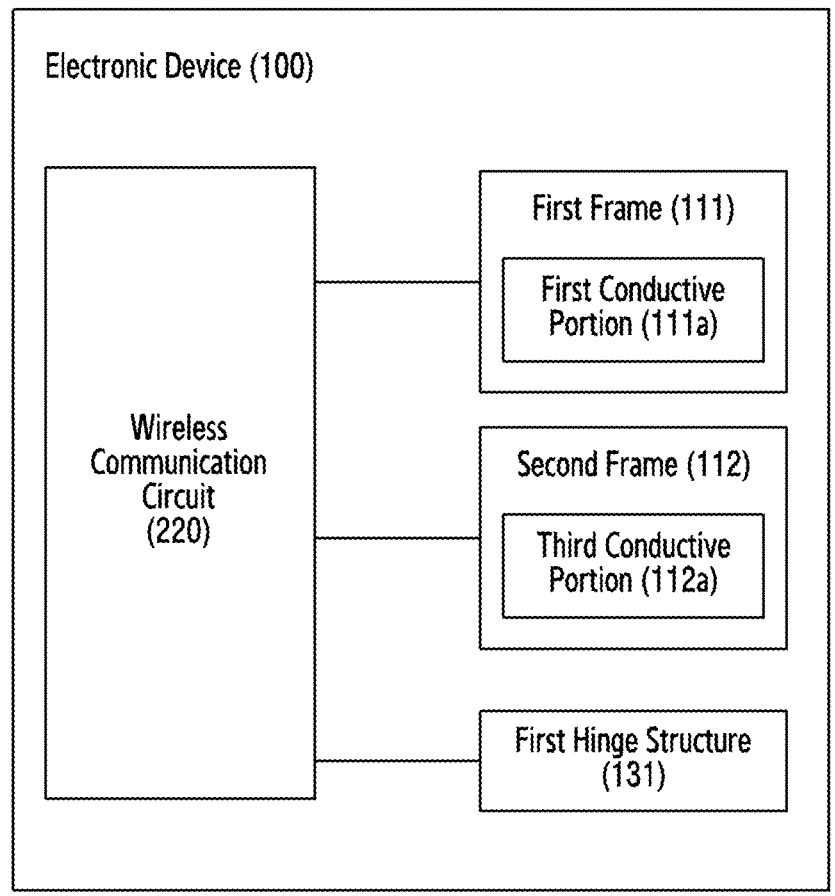
FIG. 2 is a block diagram of an electronic device according to an embodiment of the disclosure.

FIG. 2 is a block diagram of an electronic device according to an embodiment of the disclosure.

Referring to FIG. 2, the electronic device 100 according to an embodiment may include a wireless communication circuit 220, the first frame 111, the second frame 112, and/or the first hinge structure 131.

According to an embodiment, in the first state, the wireless communication circuit 220 may feed to a point of the first conductive portion 111a of the first frame 111 and/or the third conductive portion 112a of the second frame 112, and the wireless communication circuit 220 may transmit and/or receive a Radio Frequency (RF) signal of a first frequency band, based on the first conductive portion 111a and/or the third conductive portion 112a.

According to an embodiment, in the second state, the wireless communication circuit 220 may feed to a point of the first conductive portion 111a of the first frame 111 and/or a conductive portion of the first hinge structure 131, and the wireless communication circuit 220 may transmit and/or receive the RF signal of the first frequency band in the substantially same manner as in the first state, based on the first conductive portion 111a, the third conductive portion 112a, and/or the conductive portion of the first hinge structure 131.

According to an embodiment, in the second state, the wireless communication circuit 220 may feed to a point of the third conductive portion 112a of the second frame 112 and/or the conductive portion of the first hinge structure 131, and the wireless communication circuit 220 may transmit and/or receive the RF signal of the first frequency band in the substantially same manner as in the first state, based on the first conductive portion 111a, the third conductive portion 112a, and/or the conductive portion of the first hinge structure 131.

Figure 3A:
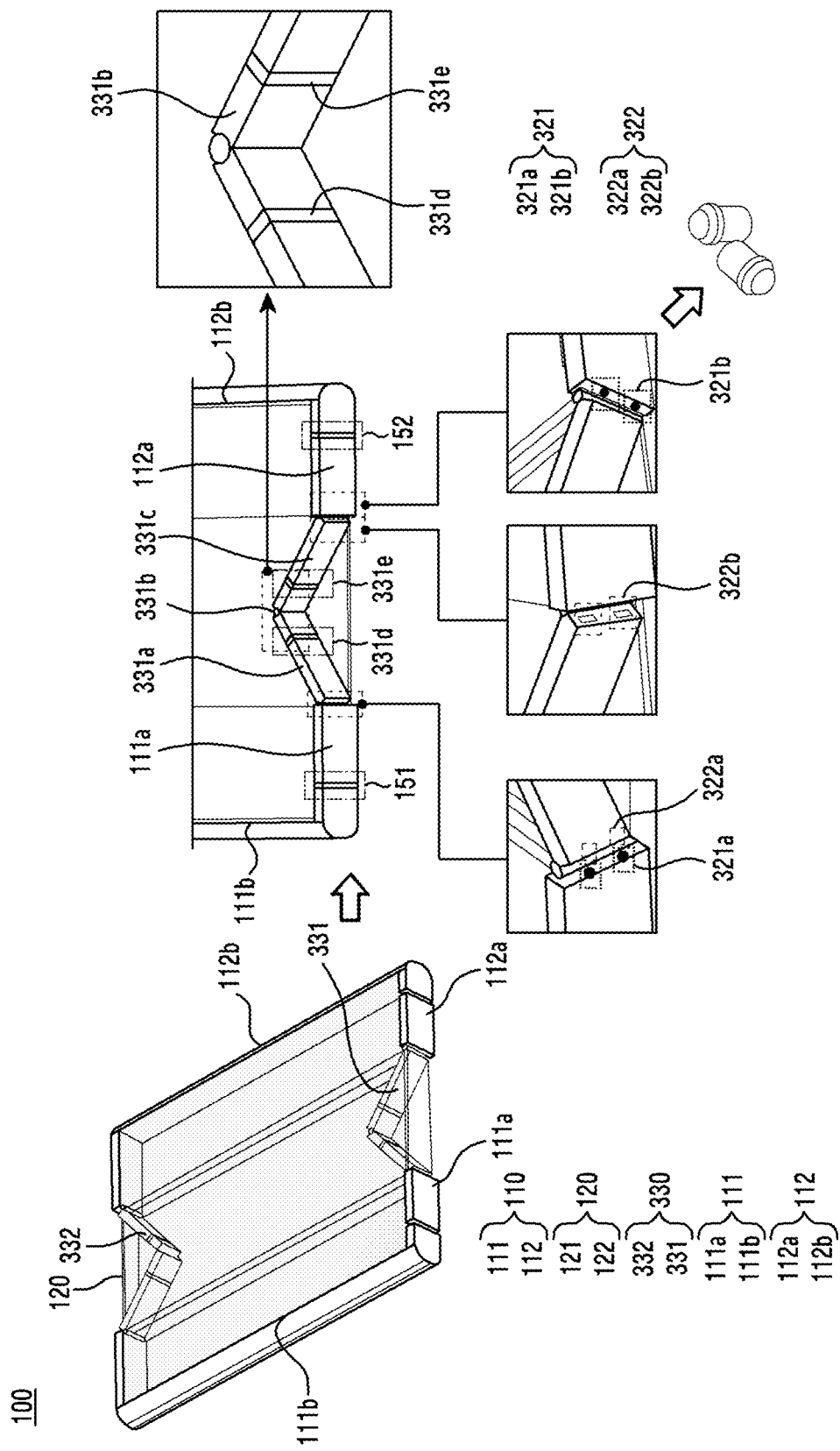
FIG. 3A illustrates a hinge structure and contact structure of an electronic device according to an embodiment of the disclosure.

FIG. 3A illustrates a hinge structure and contact structure of an electronic device according to an embodiment of the disclosure.

Figure 3B:
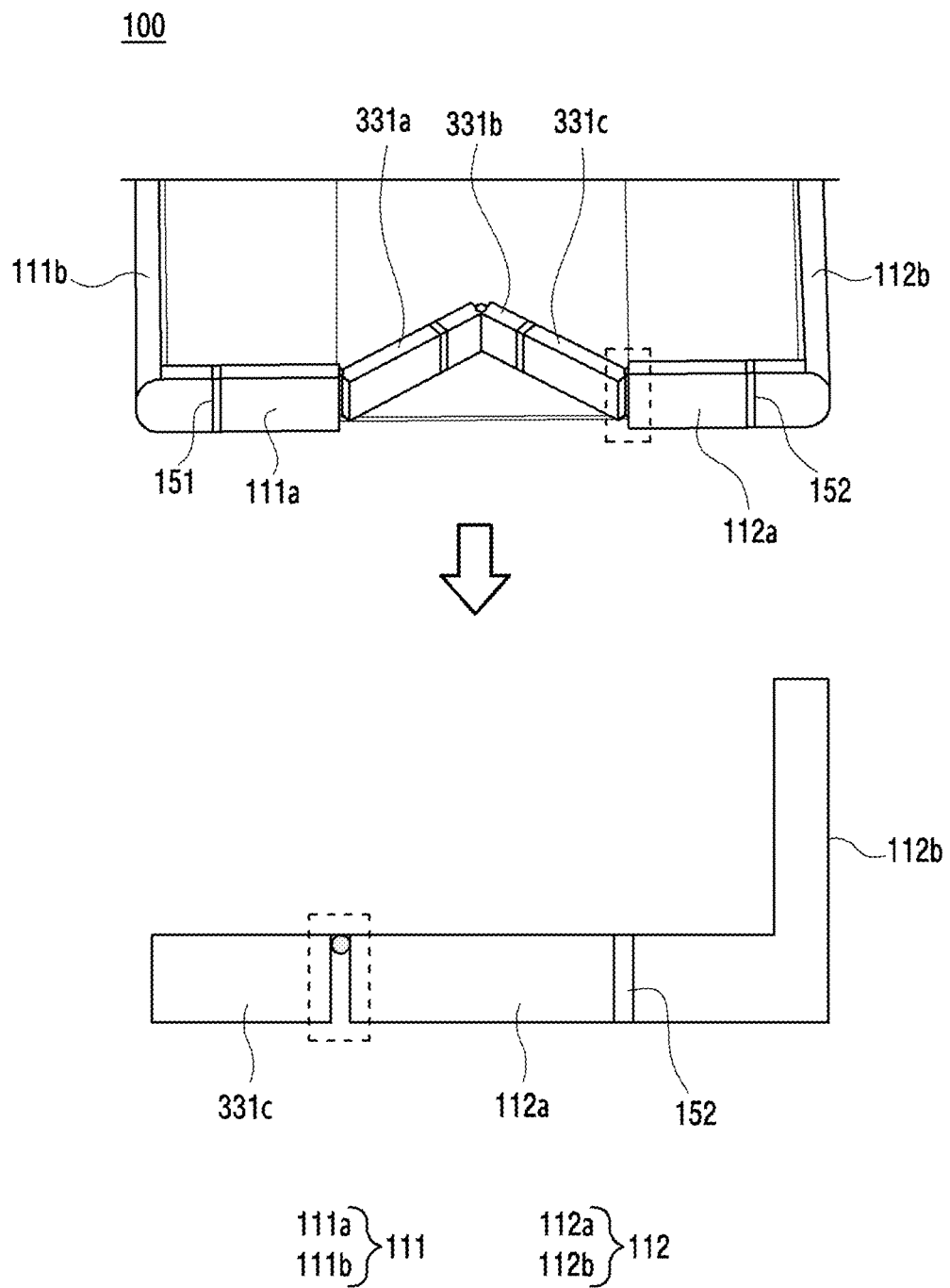
FIG. 3B illustrates a structure of electrically coupling a hinge structure and a first frame and/or a second frame through a coupling scheme according to an embodiment of the disclosure.

FIG. 3B illustrates a structure of electrically coupling a hinge structure and a first frame and/or a second frame through a coupling scheme according to an embodiment of the disclosure.

Referring to FIG. 3A, the electronic device 100 according to an embodiment may include the first segmented portion 151, the second segmented portion 152, a first contact structure 321, a second contact structure 322, and/or a hinge structure 330. In an embodiment, the hinge structure 330 may include a first hinge structure 331 and a second hinge structure 332. The same reference numerals have been used for the same or substantially the same components as those described above, and redundant descriptions will be omitted.

According to an embodiment, the first hinge structure 331 may include a first portion 331a, a second portion 331b, and/or a third portion 331c.

According to an embodiment, the first portion 331a, second portion 331b, and/or third portion 331c of the first hinge structure 331 may include a conductive portion.

According to an embodiment, the first hinge structure 331 may include a third segmented portion 331d disposed between the first portion 331a and the second portion 331b. In an embodiment, the first hinge structure 331 may include a fourth segmented portion 331e disposed between the second portion 331b and the third portion 331c.

According to an embodiment, the first contact structure 321 may include a first structure 321a and/or a second structure 321b. For example, the first structure 321a may be disposed in the first conductive portion 111a. As another example, the second structure 321b may be disposed in the third conductive portion 112a. For example, the first structure 321a may be disposed in a portion which is included in the first conductive portion 111a and which is in contact with the first portion 331a of the first hinge structure 331 in the first state. As another example, the second structure 321b may be disposed in a portion which is included in the third conductive portion 112a and which is in contact with the third portion 331c of the first hinge structure 331.

According to an embodiment, the second contact structure 322 may include a third structure 322a and/or a fourth structure 322b. For example, the third structure 322a and/or the fourth structure 322b may be disposed in a part of the first hinge structure 331, corresponding to a location of the first contact structure 321. For example, the third structure 322a may be disposed in the first portion 331a of the first hinge structure 331 so as to be in contact with the first structure 321a in the second state. As another example, the fourth structure 322b may be disposed in the third portion 331c of the first hinge structure 331 so as to be in contact with the second structure 321b in the second state.

According to an embodiment, the first contact structure 321 may be combined with the second contact structure 322 to electrically couple the housing 110 and the hinge structure 330. For example, upon transitioning of the electronic device 100 from the first state to the second state, the first structure 321a included in the first conductive portion 111a of the first frame 111 may be combined with the third structure 322a included in the first portion 331a of the first hinge structure 331 to electrically couple the first conductive portion 111a of the first frame 111 and the first portion 331a of the first hinge structure 331.

As another example, upon transitioning of the electronic device 100 from the first state to the second state, the second structure 321b included in the third conductive portion 112a of the second frame 112 may be combined with the fourth structure 322b included in the third portion 331c of the first hinge structure 331 to electrically couple the third conductive portion 112a of the second frame 112 and the third portion 331c of the first hinge structure 331.

According to an embodiment, in the first state, the first structure 321a and the second structure 321b may electrically couple the first frame 111 and the second frame 112. For example, upon transitioning of the electronic device 100 from the second state to the first state, the first structure 321a included in the first conductive portion 111a of the first frame 111 may be coupled with the second structure 321b included in the third conductive portion 112a of the second frame 112 to electrically couple the first conductive portion 111a of the first frame 111 and the third conductive portion 112a of the second frame 112.

According to an embodiment, the first contact structure 321 and/or the second contact structure 322 may include a connecting member having elasticity. For example, the connecting member may include a C-clip and/or a pogo pin. As another example, the first contact structure 321 and/or the second contact structure 322 may include a conductive patch structure. For example, when the connecting member has elasticity such as the C-clip, the second contact structure 322 may include the conductive patch structure.

Referring to FIG. 3B, according to an embodiment, in the second state, the third conductive portion 112a may be electrically coupled to the first hinge structure 331 through the coupling scheme. For example, in the second state, the third conductive portion 112a and the third portion 331c of the first hinge structure 331 may be spaced apart by a specific distance. In this case, the third conductive portion 112a may be electrically coupled to the third portion 331c through the coupling scheme. In an embodiment, the coupling scheme may refer to a phenomenon in which alternating current signal energy is electromagnetically transmitted mutually between independent spaces or lines. In an embodiment, a non-conductive material (e.g., plastic resin) may be disposed between the third conductive portion 112a and the third portion 331c.

Although it is illustrated in FIG. 3B that the third portion 331c of the third hinge structure 311 and the third conductive portion 112a are coupled through a third joint 353 to be described below with reference to FIG. 3C, in this case, the third joint 353 may be constructed of a non-conductive material. Accordingly, the third portion 331c and the third conductive portion 112a may be electrically coupled through the coupling scheme.

According to an embodiment, in the second state, the first conductive portion 111a may be electrically coupled to the first portion 331a of the first hinge structure 331 through the coupling scheme in the substantially same manner as in the third portion 331c of the third conductive portion 112a.

Figure 3C:
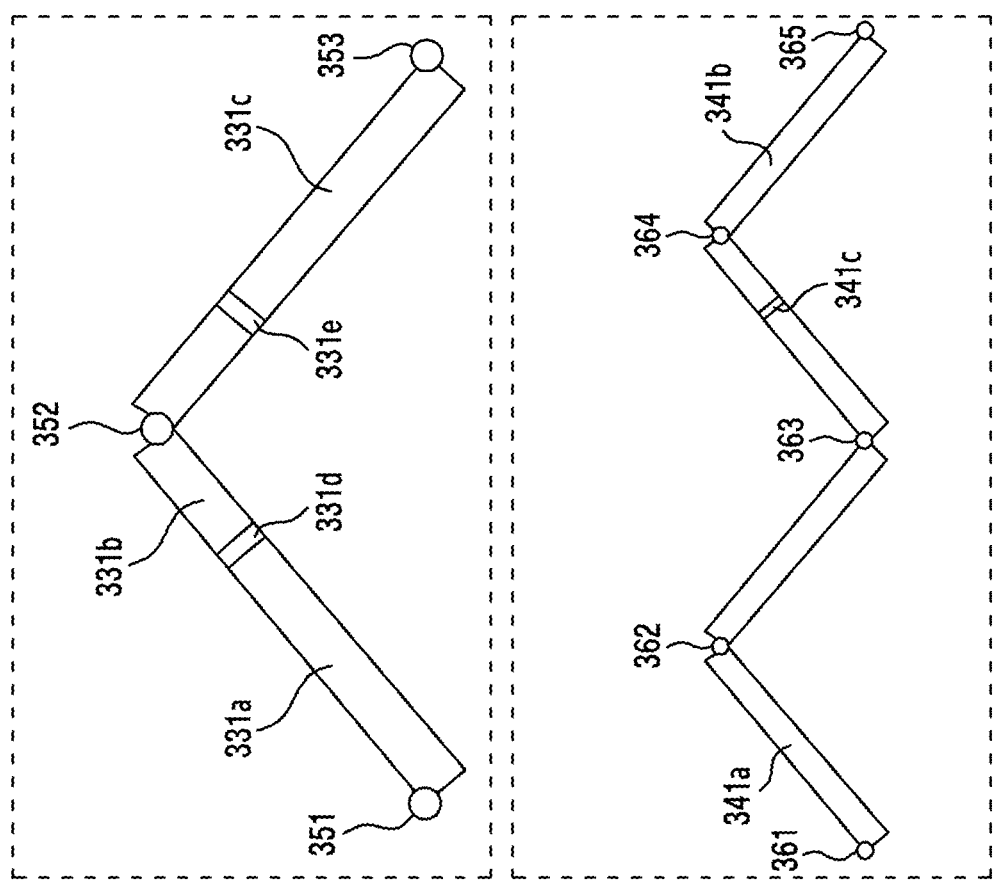
FIG. 3C illustrates a multi-joint structure of a hinge structure according to an embodiment of the disclosure.
Figure 3C:
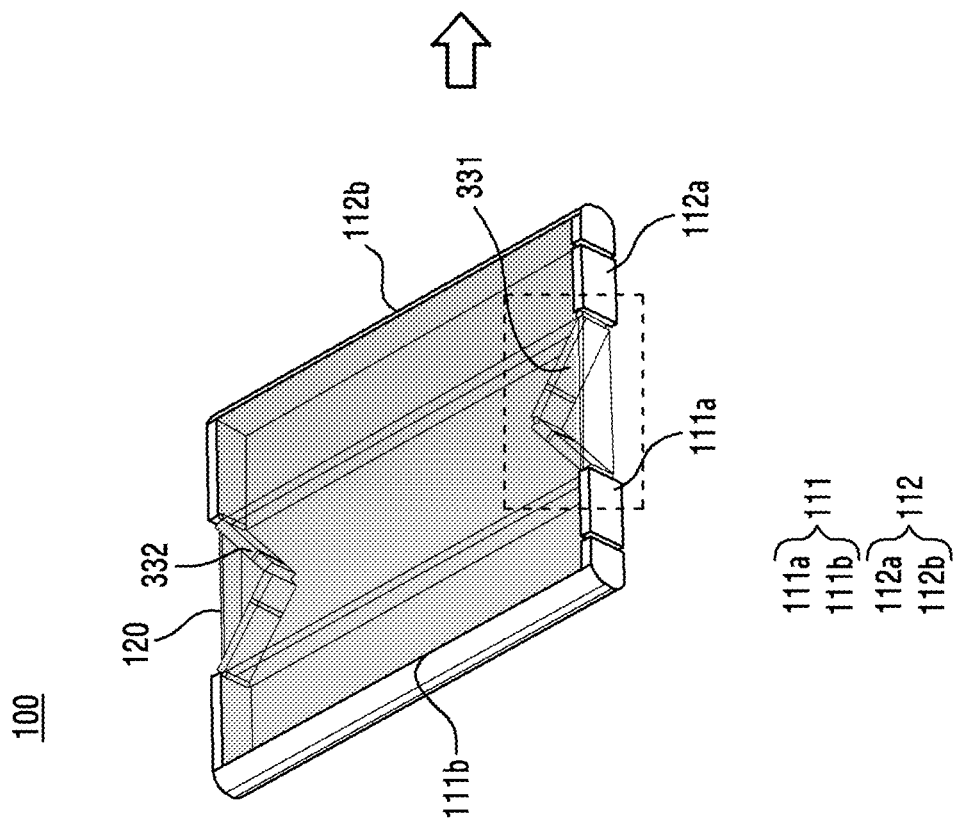

FIG. 3C illustrates a multi-joint structure of a hinge structure according to an embodiment of the disclosure.

Referring to FIG. 3C, the first hinge structure 331 according to an embodiment may be folded at one or more points. For example, the first hinge structure 331 may include a first joint 351, a second joint 352, and/or the third joint 353, and may be folded or unfolded according to a state change of the electronic device 100 through the three joints 351, 352, and 353.

According to an embodiment, in the first hinge structure 331, electrical lengths of the first portion 331a, second portion 331b, and third portion 331c of the first hinge structure 331 may vary depending on the third segmented portion 331d and/or the fourth segmented portion 331e.

According to an embodiment, the hinge structure 341 having five joints may include a fourth joint 361, a fifth joint 362, a sixth joint 363, a seventh joint 364, and/or an eighth joint 365. Through the five joints 361, 362, 363, 364, and 365, a hinge structure of another embodiment, which includes the five joints 361, 362, 363, 364, and 365, may be folded or unfolded depending on the state change of the electronic device 100.

According to an embodiment, the hinge structure 341 having the five joints may include a first portion 341a and a second portion 341b. In an embodiment, a fifth segmented portion 341c may be disposed between the first portion 341a and second portion 341b of the hinge structure 341 having the five joints. For example, a portion located at one side of the fifth segmented portion 341c may be the first portion 341a, and a portion located at the other side of the fifth segmented portion 341c may be the second portion 341b.

Referring to FIGS. 3A, 3B, and 3C, in the first state according to an embodiment, the wireless communication circuit 220 may transmit and/or receive an RF signal of a first frequency band, based on the first conductive portion 111a of the first frame 111 and the third conductive portion 112a of the second frame 112. For example, a feeding point may be located at one position of the first conductive portion 111a.

According to an embodiment, in the second state, the wireless communication circuit 220 may transmit and receive the RF signal of the first frequency band in the substantially same manner as in the first state, based on the first conductive portion 111a of the first frame 111 and/or the first portion 331a of the first hinge structure 331. For example, a first electrical path including the first conductive portion 111a and the third conductive portion may have a first electrical length L1, and a second electrical path including the first conductive portion 111a and/or the first hinge structure 331 may have a second electrical length L2. In an example, the first electrical length L1 and the second electrical length L2 may be substantially identical. Accordingly, the wireless communication circuit 220 may transmit and/or receive the RF signal of the first frequency band, based on the first electrical path having the first electrical length L1 when in the first state, and may transmit and/or receive the RF signal of the first frequency band in the same manner as in the first state, based on the second electrical path having the same electrical length as the first electrical path when in the second state.

However, in an embodiment, the first electrical length L1 and the second electrical length L2 may not be identical. Even if the first electrical length L1 and the second electrical length L2 are not identical, the electronic device 100 may transmit and/or receive a signal of substantially the same frequency band in both the first state and the second state through impedance matching. For example, the electronic device 100 may include a matching circuit (not shown) for impedance matching and/or a lumped element. When in the first state or the second state, the wireless communication circuit 220 may transmit and/or receive the RF signal of the first frequency band in substantially the same manner as in the first state or the second state by using the matching circuit and/or the lumped circuit.

According to an embodiment, when feeding to the third conductive portion 112a, in the second state, the wireless communication circuit 220 may transmit and/or receive the RF signal of the first frequency band, based on the third conductive portion 112a of the second frame 112 and/or the third portion 331c of the first hinge structure 331.

Figure 4:
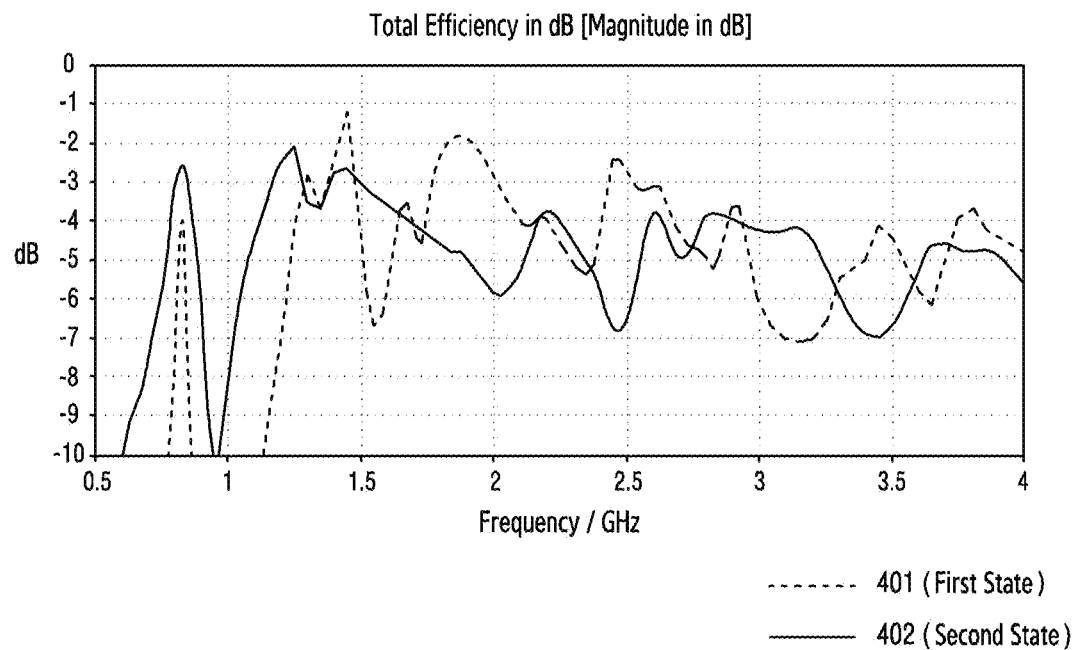
FIG. 4 illustrates antenna radiation efficiency in a first state or second state of an electronic device according to an embodiment of the disclosure.
Figure 4:
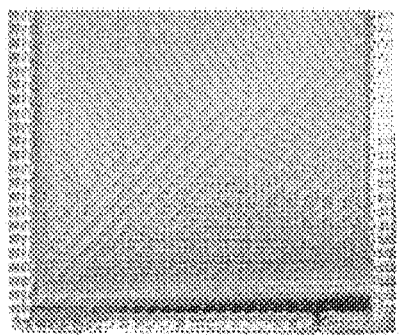
Figure 4:
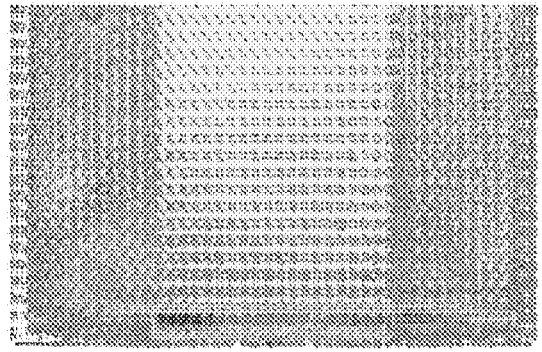

FIG. 4 illustrates antenna radiation efficiency in a first state or second state of an electronic device according to an embodiment of the disclosure.

Referring to FIG. 4, an antenna radiation efficiency graph 401 of the electronic device 100 in the first state is illustrated according to an embodiment. Hereinafter, the antenna radiation efficiency graph 401 of a first antenna of the electronic device 100 in the first state may refer to the first state graph 401. In an embodiment, an antenna radiation efficiency graph 402 of a second antenna of the electronic device 100 is illustrated in the second state. Hereinafter, the antenna radiation efficiency graph 402 of the electronic device 100 in the second state may refer to the second state graph 402. For example, the first antenna may mean an antenna which utilizes the first conductive portion 111a of the first frame 111 and the third conductive portion 112a of the second frame 112 as an antenna radiator. For example, the second antenna may mean an antenna which utilizes the first conductive portion 111a of the first frame 111 and the first hinge structure 131 as the antenna radiator. As another example, the second antenna may mean an antenna which utilizes the third conductive portion 112a of the second frame 112 and the first hinge structure 131 as the antenna radiator.

According to an embodiment, the first state graph 401 has antenna radiation efficiency of about −4 dB in a frequency band of about 0.8 gigahertz (GHz). In an embodiment, the second state graph 402 has antenna radiation efficiency of about-3 dB in a frequency band of about 0.8 GHz. In an embodiment, feeding points of the first antenna and second antenna may be located at the first conductive portion 111a.

According to an embodiment, in the first state, the electronic device 100 has antenna radiation efficiency of about 4 dB in a frequency band of about 0.8 GHZ, based on the first conductive portion 111a of the first frame 111 and the third conductive portion 112a of the second frame 112.

According to an embodiment, in the second state, the electronic device 100 has antenna radiation efficiency of about −3 dB in a frequency band of about 0.3 GHZ, based on the first conductive portion 111a of the first frame 111 and the first portion 331a of the first hinge structure 331.

According to an embodiment, in the first state and the second state, the wireless communication circuit 220 may transmit and receive an RF signal of substantially the same frequency band.

For example, in the first state, the wireless communication circuit 220 may transmit and/or receive an RF signal of a frequency band of about 0.8 GHz, based on the first conductive portion 111a of the first frame and the third conductive portion 112a of the second frame 112. As another example, in the second state, the wireless communication circuit 220 may transmit and/or receive the RF signal of the frequency band of about 0.8 GHz, based on the first conductive portion 111a of the first frame 111 and the first portion 331a of the first hinge structure 331.

Figure 5:
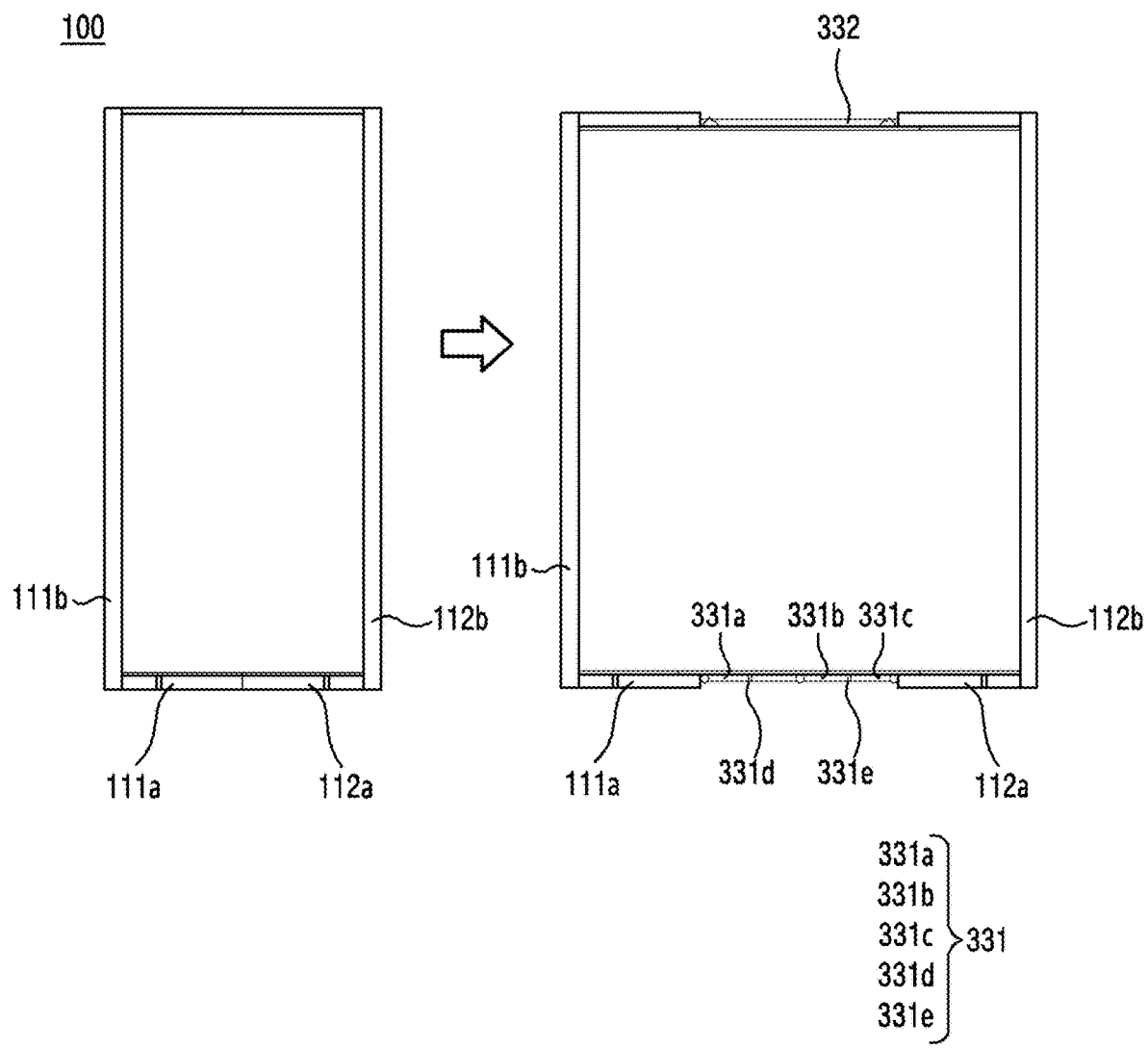
FIG. 5 illustrates a first frame, second frame, and hinge structure for securing a designated frequency band in a first state or second state of an electronic device according to an embodiment of the disclosure.

FIG. 5 illustrates a first frame, second frame, and hinge structure for securing a designated frequency band in a first state or second state of an electronic device according to an embodiment of the disclosure.

According to an embodiment, a wireless communication circuit (e.g., the wireless communication circuit 220 of FIG. 2) of the electronic device 100 may transmit and receive an RF signal of a designated frequency band in the first state and the second state. For example, when in the first state, the wireless communication circuit 220 may transmit and/or receive the RF signal of the first frequency band, based on the first conductive portion 111a of the first frame 111 and the third conductive portion 112a of the second frame 112. When in the second state, the wireless communication circuit 220 may transmit and/or receive the RF signal of the first frequency band in the same manner as in the first state, based on the third conductive portion 112a of the second frame 112 and the third portion 331c of the first hinge structure 331. For example, a feeding point may be located at the third conductive portion 112a.

As another example, when in the first state, the wireless communication circuit 220 may transmit and/or receive an RF signal of a second frequency band, based on the first conductive portion 11a of the first frame 111, the third conductive portion 112a of the second frame 112, and the fourth conductive portion 112b of the second frame 112. When in the second state, the wireless communication circuit 220 may transmit and/or receive the RF signal of the second frequency band in the same manner as in the first state, based on the third portion 331c of the first hinge structure 331, the third conductive portion 112a of the second frame 112, and the fourth conductive portion 112b of the second frame 112.

Figure 6:
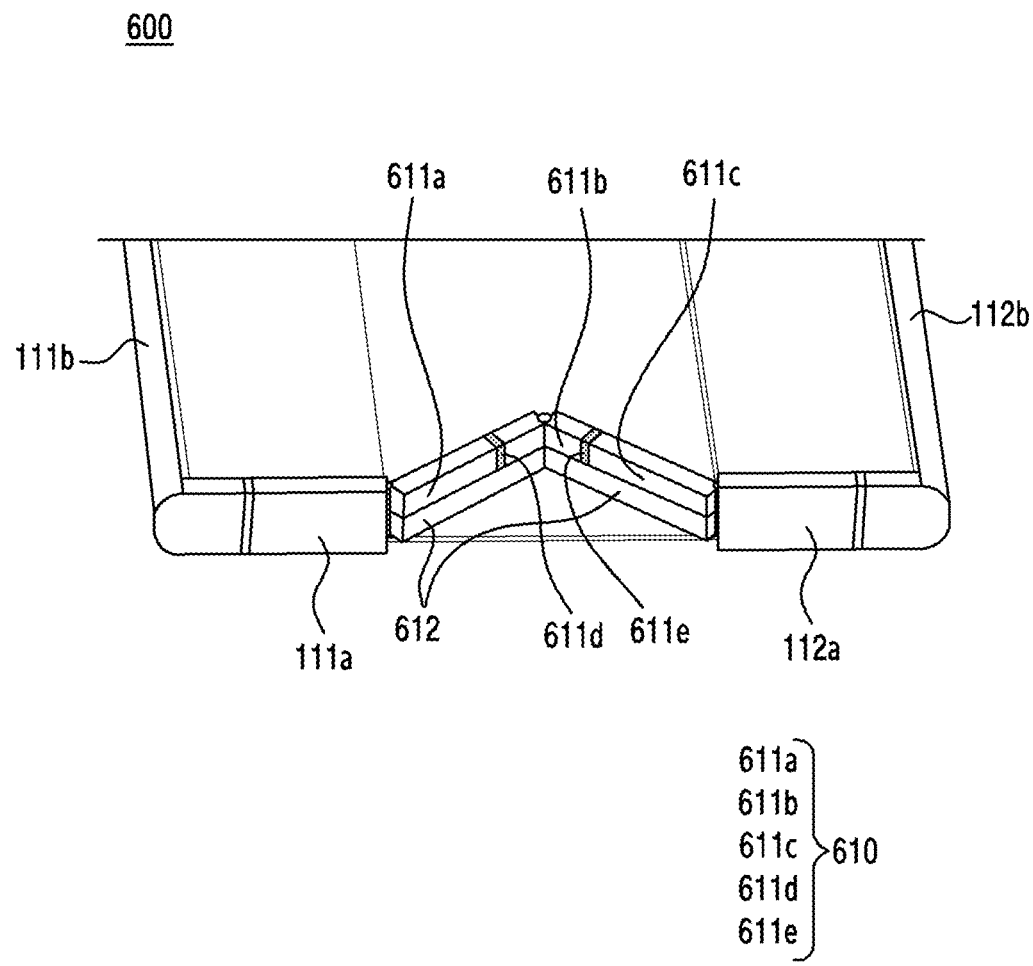
FIG. 6 illustrates a hinge structure in which a conductive portion and injection portion of a hinge structure are in contact in a region according to an embodiment of the disclosure.

FIG. 6 illustrates a hinge structure in which a conductive portion and injection portion of a hinge structure are in contact in a region according to an embodiment of the disclosure.

Figure 7:
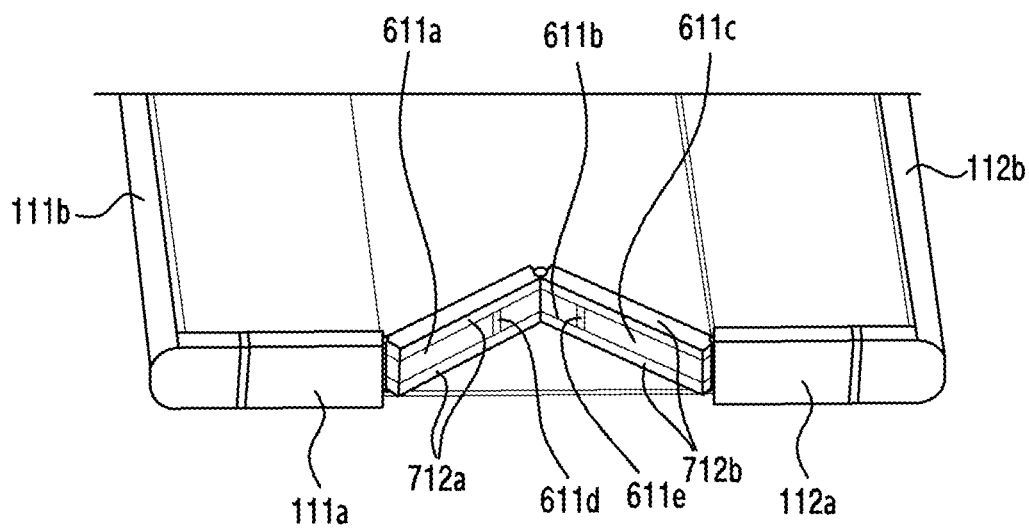
FIG. 7 illustrates a hinge structure in which a conductive portion is disposed between injection portions according to an embodiment of the disclosure.

FIG. 7 illustrates a hinge structure in which a conductive portion is disposed between injection portions according to an embodiment of the disclosure.

Referring to FIGS. 6 and 7, an electronic device 600 according to an embodiment may include a hinge structure 610. The hinge structure 610 may include a first conductive portion 611a, a second conductive portion 611b, a third conductive portion 611c, a first segmented portion 611d, and/or a second segmented portion 611e. The same reference numerals have been used for the same or substantially the same components as those described above, and redundant descriptions will be omitted. The first segmented portion 611d and/or the second segmented portion 611e may be filled with, for example, an insulating member (e.g., plastic resin).

According to an embodiment, the first segmented portion 611d may be disposed between the first conductive portion 611a and the second conductive portion 611b. In an embodiment, the second segmented portion 611e may be disposed between the second conductive portion 611b and the third conductive portion 611c.

According to an embodiment, the hinge structure 610 may further include injection members 612 and 712 (e.g., plastic resin). For example, referring to FIG. 6, the injection member 612 may be disposed to be in contact with the conductive portions 611a, 611b, and 611c of the hinge structure 610 in a region. As another example, referring to FIG. 7, a first portion 712a of the injection member 712 may be disposed on an upper face and lower face of part of the first conductive portion 611a and second conducive portion 611b. As another example, a second portion 712b of the injection member 712 may be disposed on part of the second conductive portion 611b and an upper face and lower face of the third conductive portion 611c.

Figure 8:
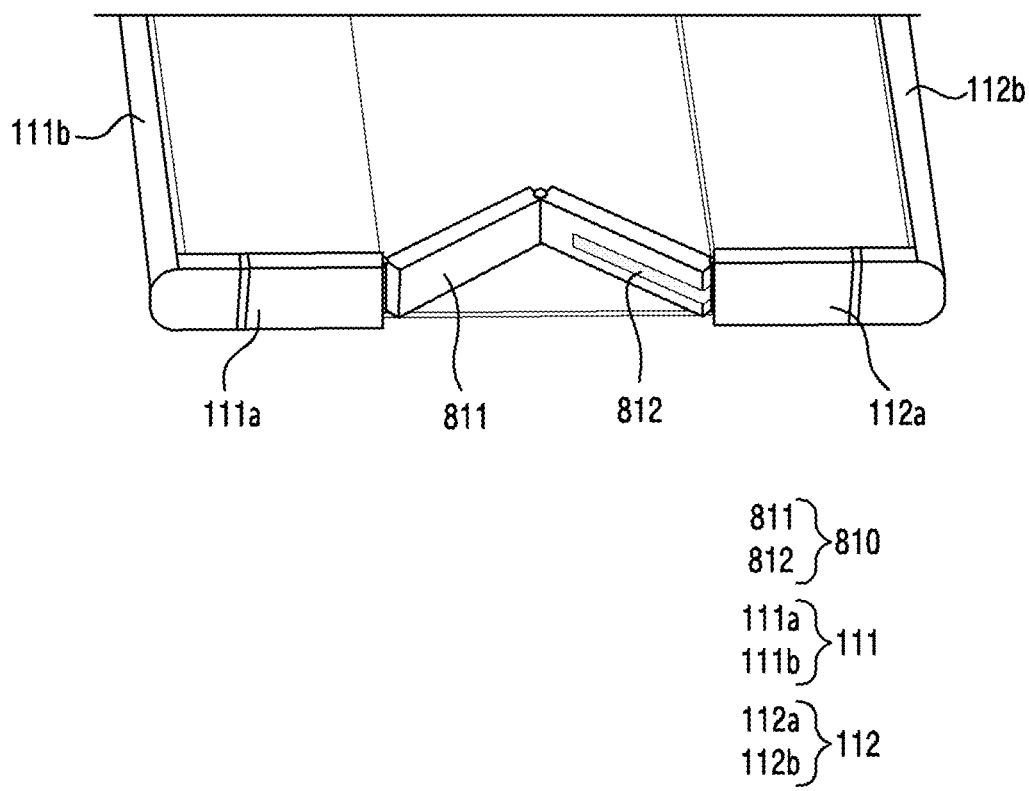
FIG. 8 illustrates an additional antenna structure included in a hinge structure according to an embodiment of the disclosure.

FIG. 8 illustrates an additional antenna structure included in a hinge structure according to an embodiment of the disclosure.

According to an embodiment, an electronic device 800 may include a hinge structure 810. In an embodiment, the hinge structure 810 may be coupled to the first conductive portion 111a of the first frame 111 and the third conductive portion 112a of the second frame 112. The same reference numerals have been used for the same or substantially the same components as those described above, and redundant descriptions will be omitted.

According to an embodiment, the hinge structure 810 may include an insulating material in a first portion 811. In an embodiment, the hinge structure 810 may include a conductive pattern 812. The conductive pattern 812 may be constructed in various manners. For example, the conductive pattern 812 may be constructed by using laser direct structuring (LDS), or may be constructed, for example, by deposition and/or stainless steel (STS). As another example, the conductive pattern 812 may be constructed through a flexible printed circuit board.

According to an embodiment, a region in which the conductive pattern 812 is disposed in the hinge structure 810 may include a non-conductive material.

According to an embodiment, when the electronic device 800 is in the first state, the wireless communication circuit 220 may transmit and/or receive an RF signal of a first frequency band, based on the first conductive portion 111a and the third conductive portion 112a. When the electronic device 800 is in the second state, the wireless communication circuit 220 may transmit and/or receive the RF signal of the first frequency band in the substantially same manner as in the first state, based on the conductive pattern 812 and the third conductive portion 112a. For example, the conductive pattern 812 and the third conductive portion 112a of the second frame 112 may be electrically or electromagnetically coupled. A feeding point may be located at the third conductive portion 112a.

However, a shape and/or size of the conductive pattern 812 is not limited to a shape and/or size of the conductive pattern 812 of FIG. 8, and may vary depending on a frequency band in which the wireless communication circuit 220 performs transmission and/or reception, based on the conductive pattern 812. In another embodiment, the wireless communication circuit 220 may transmit and/or receive a signal of various frequency bands, based on the conductive pattern 812. For example, when in the second state, the wireless communication circuit 220 may transmit and/or receive an RF signal of a second frequency band, based on the third conductive portion 112a of the second frame 112 and the conductive pattern 812.

Figure 9:
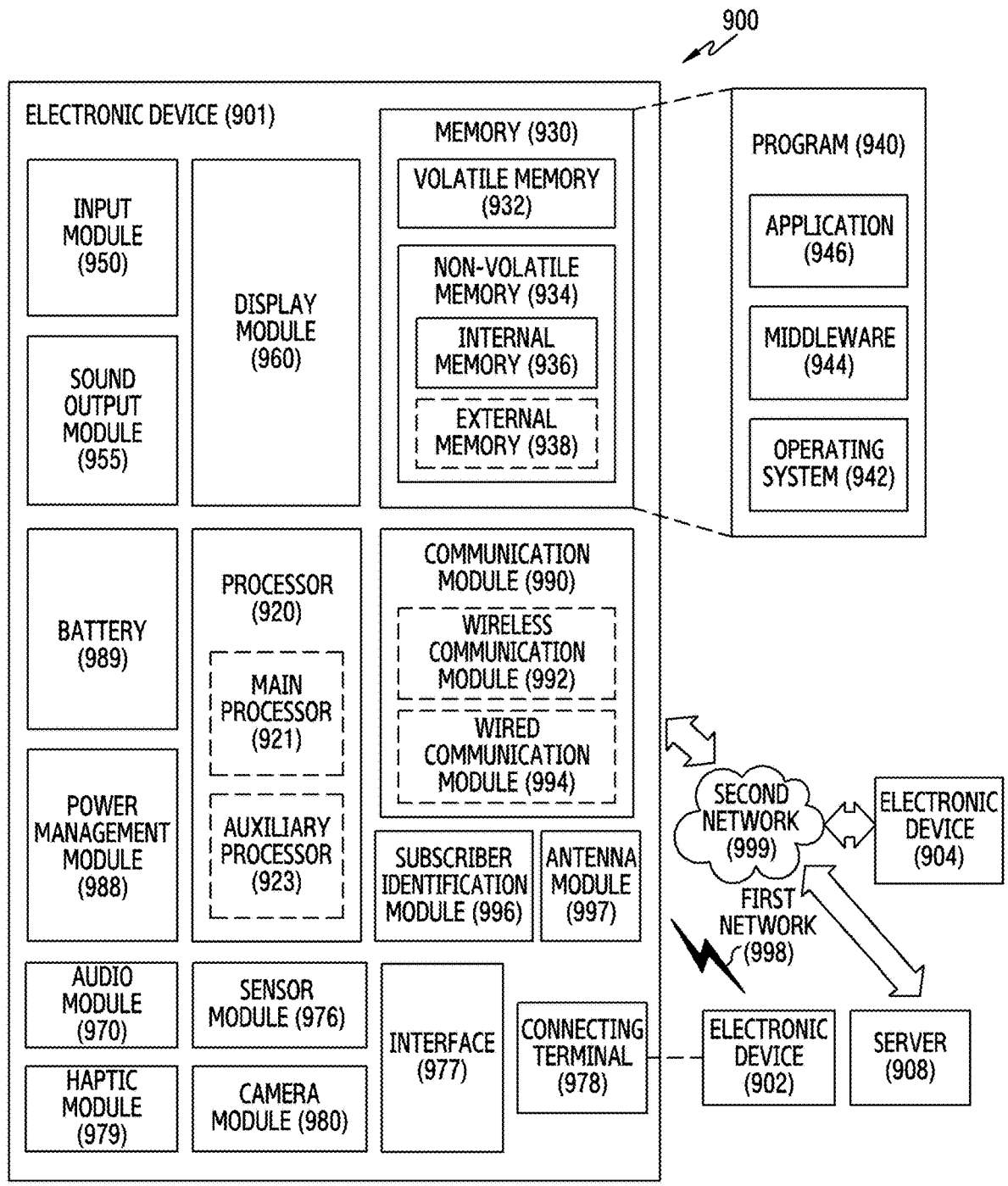
FIG. 9 is a block diagram of an electronic device in a network environment, according to an embodiment of the disclosure.

FIG. 9 is a block diagram illustrating an electronic device 901 in a network environment 900 according to an embodiment of the disclosure.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

According to an embodiment, an electronic device may include a housing including a first frame and a second frame, the first frame including a first insulating member formed in a first point and a first conductive portion extending from the first point to a first end of the first frame, and the second frame including a second insulating member formed in a second point and a second conductive portion extending from the second point to a second end of the second frame facing the first end of the first frame; a hinge structure coupled to the first end of the first frame and the second end of the second frame, foldable in at least one point, and including a conductive portion; at least one contact structure electrically connecting the conductive portion and at least one of the first frame and the second frame; and a wireless communication circuit disposed inside the housing. In a first state in which the hinge structure is in a folded state and the first end of the first frame and the second end of the second frame are electrically in contact, the wireless communication circuit may at least one of transmit or receive a signal of a first frequency band, based on the first conductive portion of the first frame and the second conductive portion of the second frame. In a second state in which the hinge structure is in an unfolded state and the first end of the first frame and the conductive portion of the hinge structure are electrically connected by the at least one contact structure, the wireless communication circuit may at least one of transmit or receive the signal of the first frequency band, based on the first conductive portion of the first frame and the conductive portion of the hinge structure.

According to an embodiment, the second conductive portion of the second frame and the conductive portion of the hinge structure may have substantially a same electrical length.

The electronic device according to an embodiment may further include a lumped element electrically connected to the hinge structure. The wireless communication circuit may at least one of transmit or receive the signal of the first frequency band, based on the first conductive portion of the first frame, the conductive portion of the hinge structure, and the limped element.

According to an embodiment the hinge structure may include a first contact surface in contact with the first end of the first frame, and a second contact surface in contact with the second end of the second frame.

According to an embodiment, the hinge structure may include a third insulating member disposed in a third point of the hinge structure, a fourth insulating member disposed in a fourth point spaced apart from the third point, a first portion extending from the third insulating member to the first contact surface, a second portion extending from the third insulating member to the first insulating member, and a third portion extending from the fourth insulating member to the second contact surface.

According to an embodiment the first portion of the hinge structure may include the conductive portion. The conductive portion may have a same electrical length as the second conductive portion of the second frame.

According to an embodiment, the third portion of the hinge structure may include the conductive portion. In the second state, the wireless communication circuit may at least one of transmit or receive the signal of the first frequency band, based on the second conductive portion of the second frame and the third portion of the hinge structure.

According to an embodiment, the hinge structure may include a third insulating member at a point of the hinge structure, a first portion having a first length extending from the third insulting member to the first contact surface, and a second portion having a second length extending from the third insulating member to the second contact surface.

According to an embodiment, in the second state, the wireless communication circuit may be configured to at least one of transmit or receive the signal of the first frequency band, based on the first conductive portion of the first frame and the first portion of the hinge structure, and at least one of transmit or receive a signal of a second frequency band, based on the second conductive portion of the second frame and the second portion of the hinge structure.

According to an embodiment, in the first state, the first end of the first frame and the second end of the second frame may be electrically connected by the at least one contact structure.

According to an embodiment, in the first state, the first end of the first frame and the second end of the second frame may be directly in contact.

According to an embodiment, the hinge structure may include a conductive pattern based on laser direct structuring (LDS) in a region. The wireless communication circuit may at least one of transmit or receive the signal of the first frequency band, based on an electrical length including the first conductive portion of the first frame and the conductive pattern.

According to an embodiment, the second conductive portion of the second frame and the conductive pattern of the hinge structure may have a same electrical length.

According to an embodiment, the first frequency band may include 0.8 GHz.

The electronic device according to an embodiment may further include a flexible display. The flexible display may be drawn into the housing upon transitioning from the second state to the first state. The flexible display may be drawn out of the housing upon transitioning from the first state to the second state.

According to an embodiment, an electronic device may include a frame structure (or, frame) constituting at least part of a side surface of the electronic device, a hinge structure including a conductive portion in the at least part thereof, at least one contact structure electrically coupling the conductive portion of the hinge structure and at least one of a first frame and a second frame, and a wireless communication circuit. The frame structure may include the first frame and the second frame. The first frame may include a first insulating member and a first conductive portion of the first frame extending from the first insulating member to a first end of the first frame in one point. The second frame may include a second insulating member and a second conductive portion extending from the second insulating member to a second end of the second frame facing the first end of the first frame in one point. The hinge structure which is folded in at least one point may be coupled to the first conductive portion of the first frame and the second conductive portion of the second frame. Upon transitioning from a second state to a first state, the hinge structure may be folded and drawn into the frame structure, and the first end of the first frame and the second end of the second frame may be in contact so that the first conductive portion of the first frame is electrically coupled to the second conductive portion of the second frame. Upon transitioning from the first state to the second state, the hinge structure may be unfolded and drawn out from the frame structure, and the first frame and the second frame may be spaced apart by a specific distance. The first conductive portion of the first frame may be electrically coupled to the conductive portion of the hinge structure through the at least one contact structure. The wireless communication circuit may at least one of transmit or receive a signal of a first frequency band, based on the first conductive portion of the first frame and the second conductive portion of the second frame in the first state, and may at least one of transmit or receive the signal of the first frequency band, based on the first conductive portion of the first frame and the conductive portion of the hinge structure in the second state.

According to an embodiment, the second conductive portion of the second frame and the conductive portion of the hinge structure may have substantially the same electrical length.

According to an embodiment the hinge structure may include a first contact surface in contact with the first end of the first frame, and a second contact surface in contact with the second end of the second frame.

According to an embodiment, the hinge structure may include a third insulating member in a third point of the hinge structure, a fourth insulating member in a fourth point spaced apart from the third point, a first portion extending from the third insulating member to the first contact surface, a second portion extending from the third insulating member to the first insulating member, and a third portion extending from the fourth insulating member to the second contact surface.

According to an embodiment the first portion of the hinge structure may include the conductive portion. The conductive portion may have the same electrical length as the second conductive portion of the second frame.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a non-transitory machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first frame and a second frame, the first frame including a first insulating member formed in a first point and a first conductive portion extending from the first point to a first end of the first frame, and the second frame including a second insulating member formed in a second point and a second conductive portion extending from the second point to a second end of the second frame facing the first end of the first frame;
   a hinge coupled to the first end of the first frame and the second end of the second frame, foldable in at least one point, and including a conductive portion;
   at least one contact structure electrically connecting the conductive portion and at least one of the first frame or the second frame; and
   a wireless communication circuit disposed in the housing,
   wherein, in a first state in which the hinge is in a folded state and the first end of the first frame and the second end of the second frame are electrically in contact, the wireless communication circuit at least one of transmits or receives a signal of a first frequency band, based on the first conductive portion of the first frame and the second conductive portion of the second frame, and
   wherein, in a second state in which the hinge is in an unfolded state and the first end of the first frame and the conductive portion of the hinge are electrically connected by the at least one contact structure, the wireless communication circuit at least one of transmits or receives the signal of the first frequency band, based on the first conductive portion of the first frame and the conductive portion of the hinge.

2. The electronic device of claim 1, wherein the second conductive portion of the second frame and the conductive portion of the hinge have substantially a same electrical length.

3. The electronic device of claim 2, further comprising:
   a lumped element electrically connected to the hinge,
   wherein the wireless communication circuit at least one of transmits or receives the signal of the first frequency band, based on the first conductive portion of the first frame, the conductive portion of the hinge, and the lumped element.

4. The electronic device of claim 1, wherein the hinge comprises:
   a first contact surface in contact with the first end of the first frame; and
   a second contact surface in contact with the second end of the second frame.

5. The electronic device of claim 4, wherein the hinge comprises:
   a third insulating member disposed in a third point of the hinge;
   a fourth insulating member disposed in a fourth point spaced apart from the third point;
   a first portion extending from the third insulating member to the first contact surface;
   a second portion extending from the third insulating member to the first insulating member; and a third portion extending from the fourth insulating member to the second contact surface.

6. The electronic device of claim 5,
wherein the first portion of the hinge comprises the conductive portion, and
wherein the conductive portion has a same electrical length as the second conductive portion of the second frame.

7. The electronic device of claim 5,
wherein the third portion of the hinge comprises the conductive portion, and
wherein, in the second state, the wireless communication circuit at least one of transmits or receives the signal of the first frequency band, based on the second conductive portion of the second frame and the third portion of the hinge.

8. The electronic device of claim 4, wherein the hinge comprises:
a third insulating member in a point of the hinge;
a first portion having a first length extending from the third insulting member to the first contact surface; and
a second portion having a second length extending from the third insulating member to the second contact surface.

9. The electronic device of claim 8, wherein, in the second state, the wireless communication circuit:
at least one of transmits or receives the signal of the first frequency band, based on the first conductive portion of the first frame and the first portion of the hinge; and
at least one of transmits or receives a signal of a second frequency band, based on the second conductive portion of the second frame and the second portion of the hinge.

10. The electronic device of claim 1, wherein, in the first state, the first end of the first frame and the second end of the second frame are electrically connected by the at least one contact structure.

11. The electronic device of claim 1, wherein, in the first state, the first end of the first frame and the second end of the second frame are directly in contact.

12. The electronic device of claim 1,
wherein the hinge comprises a conductive pattern based on laser direct structuring (LDS) in a region, and
wherein the wireless communication circuit at least one of transmits or receives the signal of the first frequency band, based on an electrical length including the first conductive portion of the first frame and the conductive pattern.

13. The electronic device of claim 12, wherein the second conductive portion of the second frame and the conductive pattern of the hinge have a same electrical length.

14. The electronic device of claim 1, wherein the first frequency band includes 0.8 gigahertz (GHz).

15. The electronic device of claim 1, further comprising:
a flexible display,
wherein the flexible display is drawn into the housing upon transitioning from the second state to the first state, and
wherein the flexible display is drawn out of the housing upon transitioning from the first state to the second state.

16. An electronic device comprising:
a frame forming at least part of a side surface of the electronic device and including a first frame and a second frame;
a hinge including a conductive portion;
at least one contact electrically connecting the conductive portion of the hinge and at least one of the first frame or the second frame; and
a wireless communication circuit,
wherein the first frame includes:
a first insulating member, and
a first conductive portion of the first frame extending from the first insulating member to a first end of the first frame,
wherein the second frame includes:
a second insulating member, and
a second conductive portion extending from the second insulating member to a second end of the second frame facing the first end of the first frame,
wherein the hinge which is folded in at least one point is coupled to the first conductive portion of the first frame and the second conductive portion of the second frame,
wherein, in case that the electronic device transitions from a second state to a first state, the hinge is folded and drawn into the frame, and the first end of the first frame and the second end of the second frame are in contact such that the first conductive portion of the first frame is electrically connected to the second conductive portion of the second frame,
wherein, in case that the electronic device transitions from the first state to the second state, the hinge is unfolded and drawn out from the frame, the first frame and the second frame is spaced apart by a specific distance, and the first conductive portion of the first frame is electrically connected to the conductive portion of the hinge via the at least one contact, and
wherein the wireless communication circuit is configured to:
transmit and/or receive a signal of a first frequency band, based on the first conductive portion of the first frame and the second conductive portion of the second frame in the first state, and
transmit and/or receive the signal of the first frequency band, based on the first conductive portion of the first frame and the conductive portion of the hinge in the second state.

17. The electronic device of claim 16, wherein the second conductive portion of the second frame and the conductive portion of the hinge have substantially a same electrical length.

18. The electronic device of claim 16, wherein the hinge includes:
a first contact surface in contact with the first end of the first frame, and
a second contact surface in contact with the second end of the second frame.

19. The electronic device of claim 18, wherein the hinge includes:
a third insulating member in a first point of the hinge,
a fourth insulating member in a second point spaced apart from the first point,
a first portion extending from the third insulating member to the first contact surface,
a second portion extending from the third insulating member to the first insulating member, and
a third portion extending from the fourth insulating member to the second contact surface.

20. The electronic device of claim 19,
wherein the first portion of the hinge includes the conductive portion, and wherein the conductive portion has a same electrical length as the second conductive portion of the second frame.

* * * * *